Dec. 30, 1941.   E. J. GASE   2,268,390
MACHINE FOR FORMING JELLY ROLLS AND THE LIKE
Filed Aug. 3, 1940

INVENTOR
EUGENE J. GASE
BY
ATTORNEY

Patented Dec. 30, 1941

2,268,390

UNITED STATES PATENT OFFICE 2,268,390

MACHINE FOR FORMING JELLY ROLLS AND THE LIKE

Eugene J. Gase, Saginaw, Mich.

Application August 3, 1940, Serial No. 350,669

1 Claim. (Cl. 107—7)

This invention relates to machines for producing dough pieces for jelly rolls and similar baked products. In machines of the kind under consideration dough pieces are passed in regular order between rollers which form them into elongated flat sheets and deposit them on a conveyor that travels, continuously or intermittently, from the rollers past a stationary pastry table at the side of the conveyor.

An operator at the table draws the flat dough sheet from the belt onto the table. He then spreads the sheet with jelly or other filling material, and sprinkles it with cinnamon or the like. He then rolls the sheet by hand on the table into a long round bar, which I shall term a dough bar, made up of spiral convolutions separated from each other by the filling material.

He then carefully picks up the dough bar from the table and places it on the conveyor with the length of the bar extending in the direction of travel of the conveyor. The dough is soft and on account of the filling material is likely to be unintentionally uncoiled or distorted. Care and accuracy are required in placing the dough bar back onto the conveyor, especially if the conveyor is moving and one part of the bar is put onto the conveyor before the remainder of the same bar is in place. When that occurs the bar on the conveyor is very likely to be in a partly uncoiled condition, resulting in imperfect finished goods, or in loss of the time required for repairing defective pieces.

My invention relates more particularly to means for accomplishing the following desirable results in a machine of the kind referred to.

It is an object of my invention to provide a simplified new and useful device whereby the dough sheets as they come from the rollers will be deposited directly on the pastry table, where they are spread and rolled into a dough bar by hand in the usual way and then can be delivered from the table onto the conveyor at any place in the width of the conveyor without likelihood of distorting the convolutions of the piece.

Other objects are to increase the output capacity of the machine and to improve the quality of the work while rendering it easier for the operator to keep newly formed jelly roll dough bars or the like from uncoiling or becoming deformed when placed onto the conveyor before being cut to length.

Another object is to provide in combination with such a machine a laterally slidable pastry production table of the kind described wherein the edge of the table can be utilized as a movable gage that enables the operator to drop the dough bar onto the belt at any place in the width of the belt with any desired spacing between the bars; the advantage of such arrangement being that the dough bars are kept straight and parallel with the direction of travel of the belt.

With the foregoing and certain other objects in view, my invention comprises the devices described and claimed and the equivalents thereof.

In the drawing, Fig. 1 is a perspective view of a pastry forming machine embodying my improved table arrangement, the view being partly diagrammatic.

Figure 1:
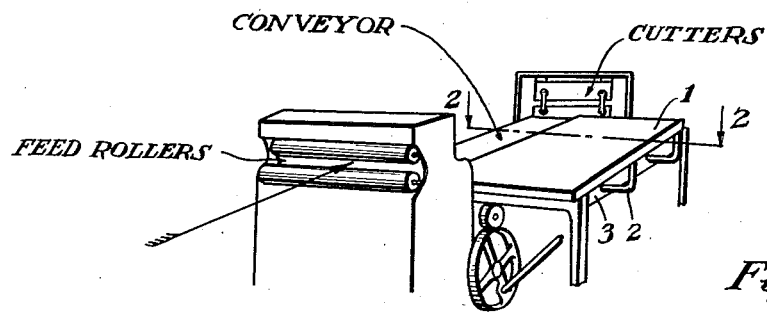

As is shown in Fig. 1, I employ the usual feed rollers, to which dough pieces of the proper size are fed one at a time, and a conveyor which carries the resulting dough sheets to a pastry table station, and also carries the filled and coiled dough bars to and through the cutters.

Figure 2:
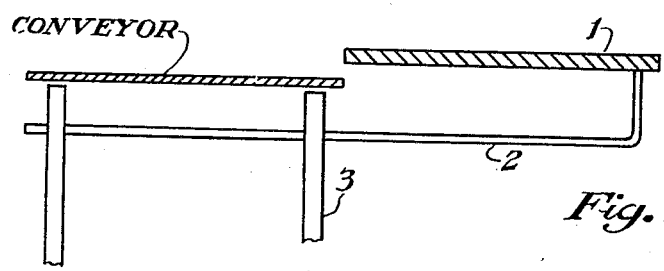
Fig. 2 is a transverse section of the table and conveyor belt, in their relative positions as shown in Fig. 1, the section being taken on the line 2—2 of Fig. 1.
Figure 3:
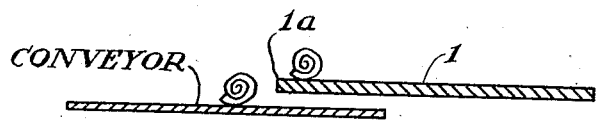
Fig. 3 is a similar view showing in full lines a formed jelly roll bar being delivered from the table to a conveyor at any predetermined place in the width of the conveyor.

In applying my improvement to such a machine I provide a transversely shiftable pastry table 1 located higher than the conveyor. The table may be mounted on slidable guides 2 that move in a suitable fixed support such as, for example, the machine frame 3. Thus the table 1 can be slid by the operator to a position covering the conveyor as shown in Fig. 4, or the table can be drawn back into the position shown in Figs. 1 and 2 to expose the whole width of the conveyor, or any portion thereof, as is indicated in Fig. 3.

Figure 4:
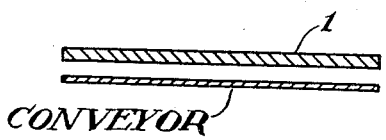
Fig. 4 is a similar cross section showing the table in the position it occupies when it is above the conveyor in position to receive a dough sheet from the feed rollers.

The operator stands at the right hand side of the table 1, Fig. 1, and pushes the table into a position, Fig. 4, directly above the conveyor. The dough piece passes through the feed rollers in the direction of the arrow, Fig. 1, and is delivered onto the surface of table 1 instead of onto the conveyor. The operator then spreads the dough piece with jelly or other material and rolls it into the form of a long bar. He then draws the table back to any desired position with respect to the width of the belt as shown in Fig. 3, and then by hand pushes the dough bar off the edge of the table onto the belt, the table edge 1a serving as a guide or straight edge.

The belt may have either step-by-step or continuous travel. It carries the dough bar endwise through the intermittently actuated cutters, where it is cut into pieces of the desired length and weight.

If a dough bar has not passed entirely through the knives by the time the next dough piece has been sheeted, "filled" and rolled and is ready to be delivered from the table onto the conveyor, the operator does not need to wait until the first piece has gone through the knives, but can push the next dough bar over the table edge 1a onto the belt alongside the first bar. All dough bars are thus placed on the conveyor in alinement with the direction of travel of the conveyor. Each piece, regardless of its length, is delivered from the edge of the table onto the conveyor all at once, so that the conveyor can not by its forward motion distort or disarrange the dough piece bar. Hence the operator is able to run the machine much faster and turn out a greater quantity of work in a given time without any likelihood of producing defectively shaped jelly rolls or other piece goods.

Having thus described my invention, what I claim and desire to secure by Letters Patent is:

In a machine for forming jelly rolls and the like, the combination with a conveyor and means for supplying dough sheets thereto; of a pastry table extending parallel with and located higher than the conveyor surface, said table being shiftable transversely above the conveyor into position for receiving dough sheets from said supply means, or into position to expose a predetermined portion of the width of the conveyor, a longitudinal margin of said table presenting a straight edge extending parallel with the direction of travel of the conveyor, and constituting guiding means for dough bars when rolled from said edge onto the conveyor.

EUGENE J. GASE